United States Patent
Bantukul et al.

(10) Patent No.: US 8,073,127 B2
(45) Date of Patent: Dec. 6, 2011

(54) METHODS, SYSTEMS, AND COMPUTER PROGRAM PRODUCTS FOR USING A LOCATION ROUTING NUMBER BASED QUERY AND RESPONSE MECHANISM TO EFFECT SUBSCRIBER CUTOVER

(75) Inventors: Apirux Bantukul, Cary, NC (US); Peter J. Marsico, Chapel Hill, NC (US)

(73) Assignee: Tekelec, Morrisville, NC (US)

( * ) Notice: Subject to any disclaimer, the term of this patent is extended or adjusted under 35 U.S.C. 154(b) by 1106 days.

(21) Appl. No.: 11/731,768

(22) Filed: Mar. 30, 2007

(65) Prior Publication Data

US 2008/0198999 A1 Aug. 21, 2008

Related U.S. Application Data

(60) Provisional application No. 60/902,592, filed on Feb. 21, 2007.

(51) Int. Cl.
*H04M 7/00* (2006.01)

(52) U.S. Cl. ............... 379/221.13; 379/219; 379/221.14

(58) Field of Classification Search ............ 379/221.13, 379/327, 219, 221.14
See application file for complete search history.

(56) References Cited

U.S. PATENT DOCUMENTS

| | | | |
|---|---|---|---|
| 5,671,225 A | 9/1997 | Hooper et al. | |
| 5,838,683 A | 11/1998 | Corley et al. | |
| 6,134,618 A | 10/2000 | Hebert | |
| 6,182,086 B1 | 1/2001 | Lomet et al. | |
| 6,359,979 B1 | 3/2002 | Wang et al. | |
| 6,434,155 B1 | 8/2002 | Jones et al. | |
| 6,639,981 B1 | 10/2003 | Dunn, Jr. et al. | |
| 6,711,251 B1* | 3/2004 | Kieren | 379/221.13 |
| 6,731,741 B1 | 5/2004 | Fourcand et al. | |
| 6,735,621 B1 | 5/2004 | Yoakum et al. | |
| 6,836,477 B1 | 12/2004 | West, Jr. et al. | |
| 6,865,266 B1 | 3/2005 | Pershan | |
| 6,944,666 B2 | 9/2005 | Belkin | |
| 6,975,855 B1 | 12/2005 | Wallenius | |
| 7,027,433 B2 | 4/2006 | Tuohino et al. | |
| 7,031,747 B2 | 4/2006 | Cyr et al. | |
| 7,085,260 B2 | 8/2006 | Karaul et al. | |

(Continued)

FOREIGN PATENT DOCUMENTS

EP 0 865 218 A2 9/1998

(Continued)

OTHER PUBLICATIONS

Notification of Transmittal of the International Search Report and the Written Opinion of the International Searching Authority, or the Declaration for International Application No. PCT/US08/02150 (May 20, 2008).

(Continued)

*Primary Examiner* — Thjuan K Addy
(74) *Attorney, Agent, or Firm* — Jenkins, Wilson, Taylor & Hunt, P.A.

(57) ABSTRACT

A method for using an LRN based query and response mechanism to effect subscriber cutover includes receiving an LRN based response message including a communications service subscriber identifier. The method further includes determining a cutover switch LRN associated with the communications service subscriber identifier. The method further includes inserting the cutover switch LRN associated with the communications service subscriber identifier into the LRN based response message and routing the LRN based response message.

59 Claims, 6 Drawing Sheets

U.S. PATENT DOCUMENTS

| | | | |
|---|---|---|---|
| 7,136,651 B2 | 11/2006 | Kalavade | |
| 7,194,082 B2 * | 3/2007 | Kieren | 379/221.13 |
| 7,286,545 B1 | 10/2007 | Tester et al. | |
| 7,372,826 B2 | 5/2008 | Dahod et al. | |
| 7,403,517 B2 | 7/2008 | Westman | |
| 7,606,202 B2 | 10/2009 | Marathe et al. | |
| 2001/0040957 A1 | 11/2001 | McCann et al. | |
| 2002/0048360 A1 | 4/2002 | Zambre et al. | |
| 2003/0037108 A1 | 2/2003 | Peiffer et al. | |
| 2003/0050969 A1 | 3/2003 | Sant et al. | |
| 2003/0081754 A1 | 5/2003 | Esparza et al. | |
| 2004/0024894 A1 | 2/2004 | Osman et al. | |
| 2004/0082332 A1 | 4/2004 | McCann et al. | |
| 2004/0184435 A1 | 9/2004 | Westman | |
| 2004/0223604 A1 * | 11/2004 | Kieren | 379/327 |
| 2004/0264671 A1 | 12/2004 | Lamberton et al. | |
| 2005/0111641 A1 | 5/2005 | Koskinen et al. | |
| 2005/0281399 A1 | 12/2005 | Moisey et al. | |
| 2005/0286531 A1 | 12/2005 | Tuohino et al. | |
| 2006/0079236 A1 | 4/2006 | Del Pino et al. | |
| 2006/0104431 A1 | 5/2006 | Emery et al. | |
| 2006/0105766 A1 | 5/2006 | Azada et al. | |
| 2006/0136557 A1 | 6/2006 | Schaedler et al. | |
| 2006/0143517 A1 | 6/2006 | Douceur et al. | |
| 2006/0291488 A1 | 12/2006 | Naqvi et al. | |
| 2007/0086582 A1 | 4/2007 | Tai et al. | |
| 2007/0100981 A1 | 5/2007 | Adamczyk et al. | |
| 2007/0121908 A1 | 5/2007 | Benedyk et al. | |
| 2008/0031196 A1 | 2/2008 | Marathe et al. | |
| 2008/0112393 A1 | 5/2008 | Ho et al. | |
| 2008/0160995 A1 | 7/2008 | Thiebaut et al. | |
| 2008/0198862 A1 | 8/2008 | Bantukul et al. | |
| 2008/0198996 A1 | 8/2008 | Bantukul et al. | |
| 2008/0209564 A1 | 8/2008 | Gayde et al. | |
| 2008/0254833 A1 | 10/2008 | Keevill et al. | |
| 2009/0047932 A1 | 2/2009 | McNamara et al. | |
| 2009/0052415 A1 | 2/2009 | Ishii et al. | |
| 2009/0109903 A1 | 4/2009 | Vikberg et al. | |
| 2009/0296694 A1 | 12/2009 | Kalyanpur et al. | |

FOREIGN PATENT DOCUMENTS

| | | |
|---|---|---|
| KR | 1020030025024 A | 3/2003 |
| WO | WO 98/25392 A2 | 6/1998 |
| WO | WO 2008/013977 A2 | 1/2008 |
| WO | WO 2008/103333 A1 | 8/2008 |
| WO | WO 2008/103334 A1 | 8/2008 |
| WO | WO 2008/130709 A2 | 10/2008 |

OTHER PUBLICATIONS

Notification of Transmittal of the International Search Report and the Written Opinion of the International Searching Authority, or the Declaration for International Application No. PCT/US08/02147 (May 20, 2008).

Final Official Action for U.S. Appl. No. 11/731,772 (Mar. 25, 2010).

Notification of Transmittal of the International Search Report and the Written Opinion of the International Searching Authority, or the Declaration for International Application No. PCT/US2009/046038 (Jan. 21, 2010).

"Digital Cellular Telecommunications System (Phase 2+); Universal Mobile Telecommunications System (UMTS); Network Architecture," 3GPP TS 23.002 version 7.1.0 Release 7, ETSI TS 123 002 (Mar. 2006).

"INAP Feature Module" Cisco MGC Software Release 9.5(2), pp. 1-16 (Dec. 3, 2003).

Marshall et al., "SIP Extensions for Supporting Distributed Call State," SIP Working Group, Internet Draft, pp. 1-12 (Aug. 2001).

Liao et al., "SS7-TCAP/IP Interworking," Internet Engineering Task Force, pp. 1-14 (Mar. 1999).

Notification of Transmittal of the International Search Report and the Written Opinion of the International Searching Authority, or the Declaration for International Application No. PCT/US08/02154 (May 20, 2008).

Final Official Action for U.S. Appl. No. 12/106,807 (Feb. 15, 2011).

Official Action for U.S. Appl. No. 11/731,800 (Jan. 18, 2011).

Official Action for U.S. Appl. No. 12/016,807 (Aug. 5, 2010).

Notification of Transmittal of the International Search Report and the Written Opinion of the International Searching Authority, or the Declaration for International Application No. PCT/US2008/005176 (May 25, 2010).

Restriction and/or Election Requirement for U.S. Appl. No. 12/106,807 (Apr. 28, 2010).

"Interface Recommendation for Intelligent Network Capability Set 3: SCF-SSF Interface," ITU-T, Q.1238.2, pp. 7-9, 73-76, and 85-10 (Jun. 2000).

Official Action for U.S. Appl. No. 11/731,772 (Jul. 14, 2009).

Notice of Allowance and Fee(s) Due for U.S. Appl. No. 11/881,726 (Jun. 11, 2009).

Notification of Transmittal of the International Search Report and the Written Opinion of the International Searching Authority, or the Declaration for International Application No. PCT/US07/16974 (Sep. 11, 2008).

Commonly assigned, co-pending U.S. Patent Application, "Methods, Systems, and Computer Readable Media for Providing Next Generation Network (NGN)-Based End User Services to Legacy Subscribers in a Communications Network," filed Jun. 2, 2009.

"Mobile Wireless Overview," Cisco IOS Mobile Wireless Configuration Guide, pp. MWC-1-MWC-8 (Publication Date Unknown), Submitted on Sep. 11, 2009.

Supplementary European Search Report for European Patent No. 2 119 212 (Dec. 6, 2010).

* cited by examiner

METHODS, SYSTEMS, AND COMPUTER PROGRAM PRODUCTS FOR USING A LOCATION ROUTING NUMBER BASED QUERY AND RESPONSE MECHANISM TO EFFECT SUBSCRIBER CUTOVER

RELATED APPLICATIONS

The presently disclosed subject matter claims the benefit of U.S. Provisional Patent Application Ser. No. 60/902,592, filed Feb. 21, 2007; the disclosure of which is incorporated herein by reference in its entirety.

TECHNICAL FIELD

The subject matter described herein relates to subscriber cutover. More particularly, the subject matter described herein relates to using a location routing number based query and response mechanism (e.g., a switching office number portability system) to effect subscriber cutover.

BACKGROUND

Local number portability (LNP) allows telephone service subscribers to retain their same directory numbers when switching between geographic locations and/or telecommunications service providers. Local number portability was mandated by the Telecommunications Act of 1996.

Local number portability is made possible by a location routing number (LRN). When a subscriber's local service is moved to a new end office, the LRN associated with the ported-to end office is associated with the ported directory number in a number portability database. When a call is made to the ported directory number, the originating end office sends a query to a number portability database. The number portability database returns the LRN of the ported-to end office. The end office uses the LRN to route the call to the ported-to end office.

Number portability data is administered by a national number portability administration center (NPAC). The NPAC distributes number portability data to systems maintained by service providers, which are referred to as local service management systems (LSMSs). The local service management systems in turn populate the number portability databases maintained by each carrier.

As the number of ported directory numbers has increased, switching office processing functionality for launching number portability queries and processing number portability responses has become common. That is, switching offices typically include software implemented triggers to launch number portability queries and process the responses. Conventionally, these triggers have been used for number portability processing only. However, it may be desirable to use or leverage this processing capability for other purposes.

One purpose for which it may be desirable to utilize switching office number portability processing functionality is subscriber cutover. Cutover occurs when a subscriber's directory number is moved from one end office to another end office that has just been placed into service. For example, a service provider may determine that a new end office is needed when the processing capacity of an existing end office is close to being exceeded. Once a directory number is moved to a new end office, the network must provide some mechanism for routing calls to the cutover subscriber to the new end office.

One possible solution to this problem is to provision an LRN corresponding to the cutover end office in the number portability database. However, because the number portability database must be provisioned via the NPAC and local LSMSs for different service providers, there may be a time delay between the time that the subscriber's directory number is moved to the cutover end office and the time that the number portability database is populated. Another possible solution to this problem is to provision special cutover triggers in each switching office. However, this solution is undesirable as it would require expensive hardware and/or software upgrades to end offices.

Accordingly, in light of difficulties, there exists a need for methods, systems, and computer program products for using an LRN based query and response mechanism to effect subscriber cutover.

SUMMARY

According to one aspect, the subject matter described herein comprises methods, systems, and computer program products for using an LRN based query and response mechanism to effect subscriber cutover. One method includes receiving an LRN based response message including a communications service subscriber identifier. A cutover switch LRN associated with the communications service subscriber identifier may be determined. The cutover switch LRN associated with the communications service subscriber identifier may be inserted into the LRN based response message and routing the message.

In one implementation, receiving an LRN based response message may include intercepting a number portability response message at a routing node located between a switching office and a number portability database where the response is intended for the switching office. The response is modified by the routing node to include the LRN of a serving end office of a called party number and forwarded to the switching office. The switching office uses its number portability processing functionality to extract the LRN from the response and route the call to the serving end office.

According to another aspect, a method may include receiving an LRN based response message including an LRN and a communications service subscriber identifier. It may be determined whether the received LRN is associated with an in-network node. In response to determining that the received LRN is associated with the in-network node, a cutover switch LRN associated with the communications service subscriber identifier may be determined. Further, the cutover switch LRN associated with the communications service subscriber identifier may be inserted into the number portability response message and routing the message.

According to another aspect, an LRN based query message including a communications service subscriber identifier may be received. Further, a cutover switch LRN associated with the communications service subscriber identifier may be determined. In response to determining the cutover switch LRN, an LRN based response message associated with the number portability query message and including the cutover switch LRN may be generated.

According to another aspect, an LRN based query message including transaction identification information and a communications service subscriber identifier may be received. An LRN based response message may be associated with the LRN based query message based on the transaction identification information. Further, a cutover switch LRN associated with the communications service subscriber identifier may be determined. The cutover switch LRN associated with the communications service subscriber identifier may be inserted into the LRN based response message. Further, the message may be routed.

The subject matter described herein for effecting subscriber cutover using an LRN based query and response mechanism may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer program product comprising computer executable instructions embodied in a computer readable medium. Exemplary computer readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
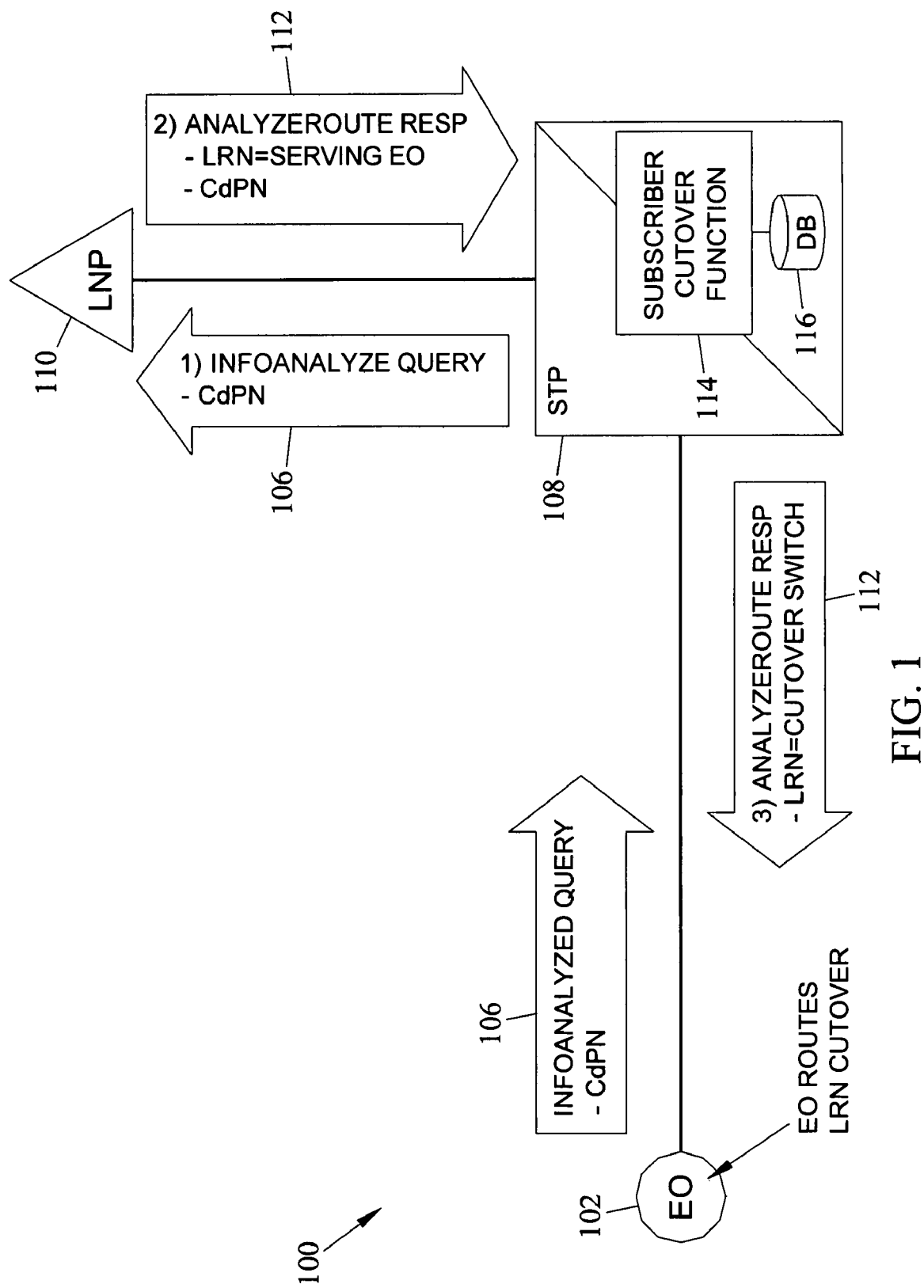
FIG. 1 is a network diagram illustrating an exemplary system for effecting subscriber cutover using switching office LRN based query and response functionality in a communications network according to an embodiment of the subject matter described herein.

Methods, systems, and computer program products for using an LRN based query and response mechanism (e.g., a switching office number portability processing mechanism) to effect subscriber cutover according to embodiments of the subject matter described herein may be implemented in any suitable network device or devices. For example, the methods, systems, and computer program products may be implemented in a routing node, a signal transfer point (STP), a router, a switch, a gateway, a media gateway controller, a softswitch or other suitable network device. FIG. 1 is a network diagram illustrating an exemplary system for effecting subscriber cutover using switching office LRN based query and response functionality in a communications network, generally designated 100, according to an embodiment of the subject matter described herein. Although FIG. 1 illustrates a switching office number portability processing system, those skilled in the art realize that the present subject matter is not limited to the depicted embodiment and is applicable to any LRN based query and response mechanism adapted for effecting subscriber cutover. Referring to FIG. 1, in response to a call attempt by a communications service subscriber, an end office 102 may send a local number portability (LNP) InfoAnalyzed query 106 to a switching transfer point (STP) routing node 108, which accesses an LNP system 110 including an LNP database in order to retrieve the routing information for the ported subscriber. Query 106 may include the called party number. Routing node 108 may route query 106 to LNP system 110.

In response to receiving query 106, LNP system 110 may retrieve a location routing number (LRN) from its database based on the called party number. LNP system 110 may return an LNP AnalyzeRoute response message 112 including a location routing number (LRN) and the called party number. The LRN may indicate the serving end office for the called party number.

Routing node 108 may receive response message 112. A subscriber cutover function 114 of routing node 108 may receive response message 112. Based on the called party number in response message 112, subscriber cutover function 114 may determine a cutover switch LRN associated with the called party number. For example, subscriber cutover function 114 may search a subscriber cutover function database 116 for a cutover switch LRN associated with the called party number. If a cutover switch LRN associated with the called party number is found, function 114 may insert the cutover switch LRN into response message 112, which may be routed to end office 102. The cutover switch LRN may be inserted in message 112 as received from LNP system 110. If response message 112 includes an LRN value provided by LNP system 110, the cutover switch LRN replaces the LRN value provided by LNP system 110. If a cutover switch LRN associated with the called party number is not found in database 116, routing node 108 routes response message 112 to end office 102 as received from LNP system 110.

Figure 2:
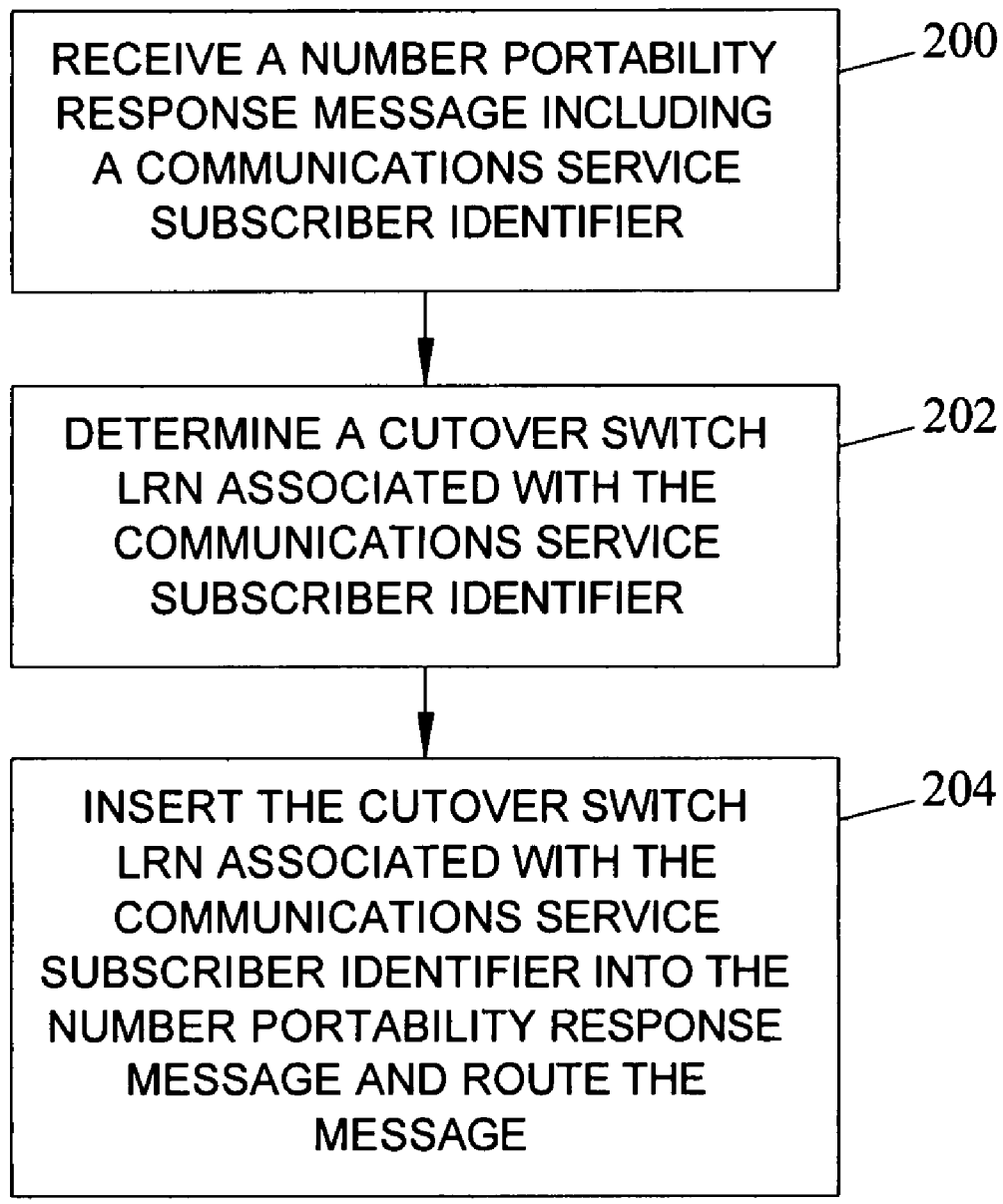
FIG. 2 is a flow chart of an exemplary process for using switching office LRN based query and response functionality to effect subscriber cutover in the communications network shown in FIG. 1 according to an embodiment of the subject matter described herein.

FIG. 2 illustrates a flow chart of an exemplary process for using an switching office LRN based query and response functionality to effect subscriber cutover in communications network 100 shown in FIG. 1 according to an embodiment of the subject matter described herein. Although FIG. 2 describes the use of number portability messages, those skilled in the art realize that any LRN based query or response messages to effect subscriber cutover may be used. Referring to FIG. 2, in block 200, subscriber cutover function 114 may receive a number portability response message including a communications service subscriber identifier. For example, subscriber cutover function 114 may receive response message 112 including a called party number.

In block 202, subscriber cutover function 114 may determine a cutover switch LRN associated with the communications service subscriber identifier. For example, subscriber cutover function 114 may use the called party number in response message 112 to perform a lookup in database 116 for a cutover switch LRN associated with the called party number.

In block 204, the cutover switch LRN associated with the communications service subscriber identifier is inserted into response message 112 and response message 112 is routed. For example, subscriber cutover function 114 may insert the cutover switch LRN associated with the called party number into response message 112. If response message 112 includes an LRN value provided by LNP system 110, the cutover switch LRN replaces the LRN value provided by LNP system 110. Further, routing node 108 may route response message 112 with the inserted cutover switch LRN to end office 102, the LNP query originator.

Figure 3:
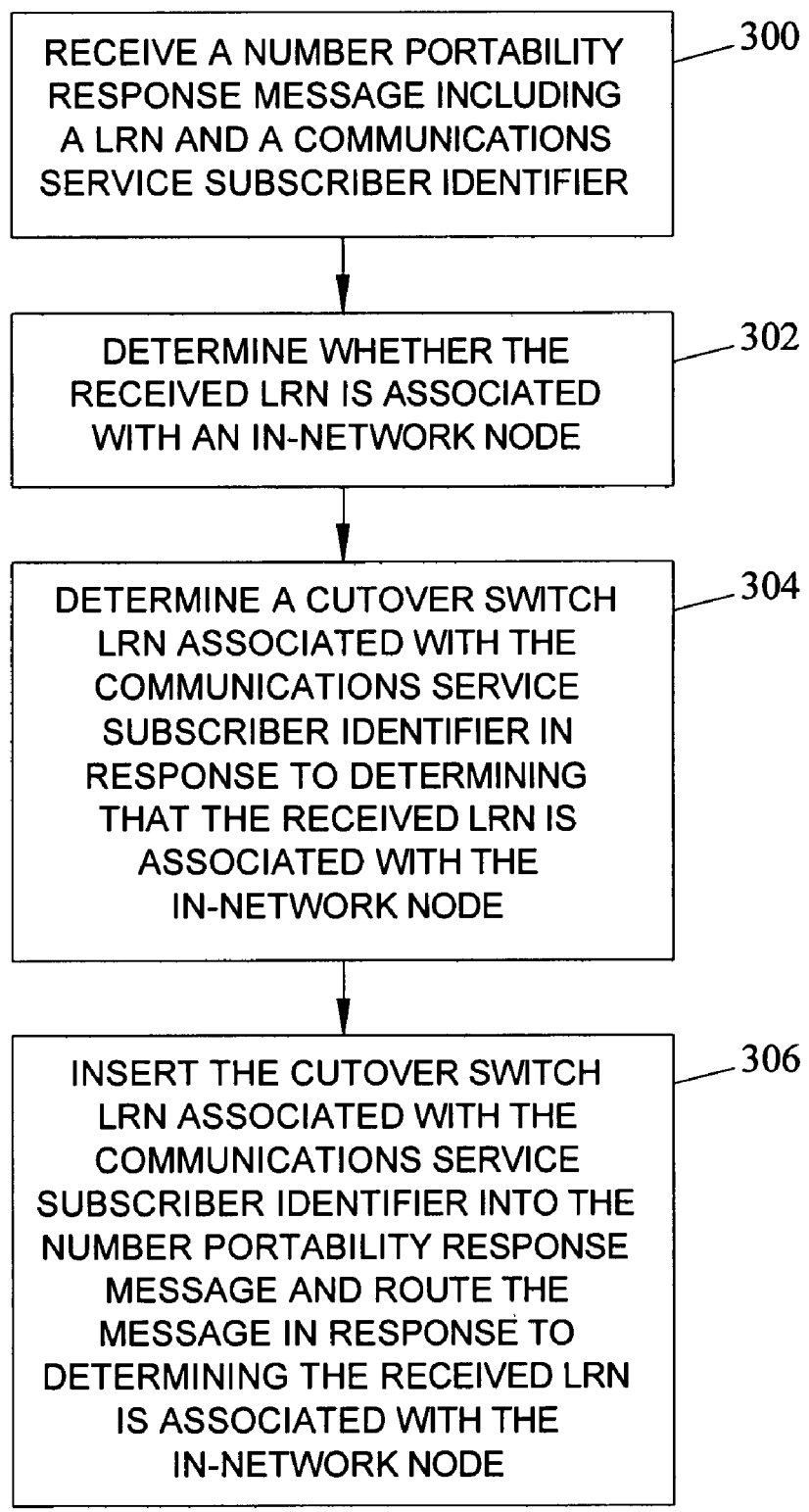
FIG. 3 is a flow chart of an exemplary process for effecting subscriber cutover using switching office LRN query and response functionality for in-network subscribers according to an embodiment of the subject matter described herein.

In the process illustrated in FIG. 2, subscriber cutover function 114 performs a lookup in database 116 for each received LNP AnayzerRoute response message. According to an enhancement of the subject matter described herein, the cutover lookup may be performed in response to determining that the LRN in the AnalyzeRoute response message is associated with an in-network node. FIG. 3 illustrates a flow chart of an exemplary process for effecting subscriber cutover using an LRN based number portability processing functionality for in-network subscribers according to an embodiment of the subject matter described herein. Although FIG. 3 describes the use of number portability messages, those skilled in the art realize that any LRN based query or response messages to effect subscriber cutover may be used. Referring to FIG. 3, in block 300, subscriber cutover function 114 may receive a number portability response message including an LRN and a communications service subscriber identifier. For example, subscriber cutover function 114 may receive response message 112 including an LRN and a called party number.

In block 302, subscriber cutover function 114 may determine whether the received LRN is associated with an in-network node. For example, an in-network node may be a switching point in a local telephone exchange that is associated with the LRN. In one example, function 114 may use the received LRN to search perform a lookup in database 116 for an indication that the received LRN is associated with an in-network node.

In response to determining that the received LRN is associated with an in-network node, function 114 may determine a cutover switch LRN associated with the communications service subscriber identifier (block 304). For example, subscriber cutover function 114 may use the received called party number to perform a lookup in database 116 for a cutover switch LRN associated with the received called party number.

Further, in response to determining that the received LRN is associated with an in-network node, the cutover switch LRN associated with the communications service subscriber identifier is inserted into response message 112 and response message 112 is routed (block 306). For example, subscriber cutover function 114 may insert the cutover switch LRN associated with the called party number into response message 112. If response message 112 includes an LRN value provided by LNP system 110, the cutover switch LRN replaces the LRN value provided by LNP system 110. Further, routing node 108 may route response message 112 with the inserted cutover switch LRN to end office 102, the LNP query originator.

In an alternate embodiment, STP 108 is adapted to receive an InfoAnalyzed message and to generate a copy of at least a portion of the InfoAnalyzed message, including the called party subscriber information (e.g., a communications service subscriber identifier) and sufficient transaction identification information to allow the InfoAnalyzed message to be associated with a corresponding AnalyzeRoute message. The number portability response message can be associated with the number portability query message by comparing the transaction identification information of the number portability query message transaction identification information of the number portability response message. In one example, if the information matches, it is determined that the messages are associated with one another. The InfoAnalyzed message copy information is temporarily buffered, and the originally received InfoAnalyzed message is routed to LNP system 110 for LNP translation processing. The temporary buffer may, for example, be a RAM or hard drive-based data storage element associated with subscriber cutover function 114. LNP system 110 processes the InfoAnalyzed query message and generates an AnalyzeRoute response message. The AnalyzeRoute message is received by STP 108, and the previously buffered InfoAnalyzed message copy information is retrieved. The retrieved called party subscriber information is used to access subscriber cutover database 116. If a matching entry is located in the subscriber cutover database, then the subscriber cutover database returns an LRN associated with a cutover switch. The cutover switch LRN is incorporated into response message 112. In one embodiment, subscriber cutover function 114 may insert the cutover switch LRN associated with the called party number into response message 112. In the event that response message 112 originally contained an LRN value provided by LNP system 110, the newly acquired cutover switch LRN overwrites the NP LRN value. If a matching entry for the subscriber identifier is not found in the subscriber cutover database, then the response message 112 is routed to the query originator, EO 102.

Figure 4:
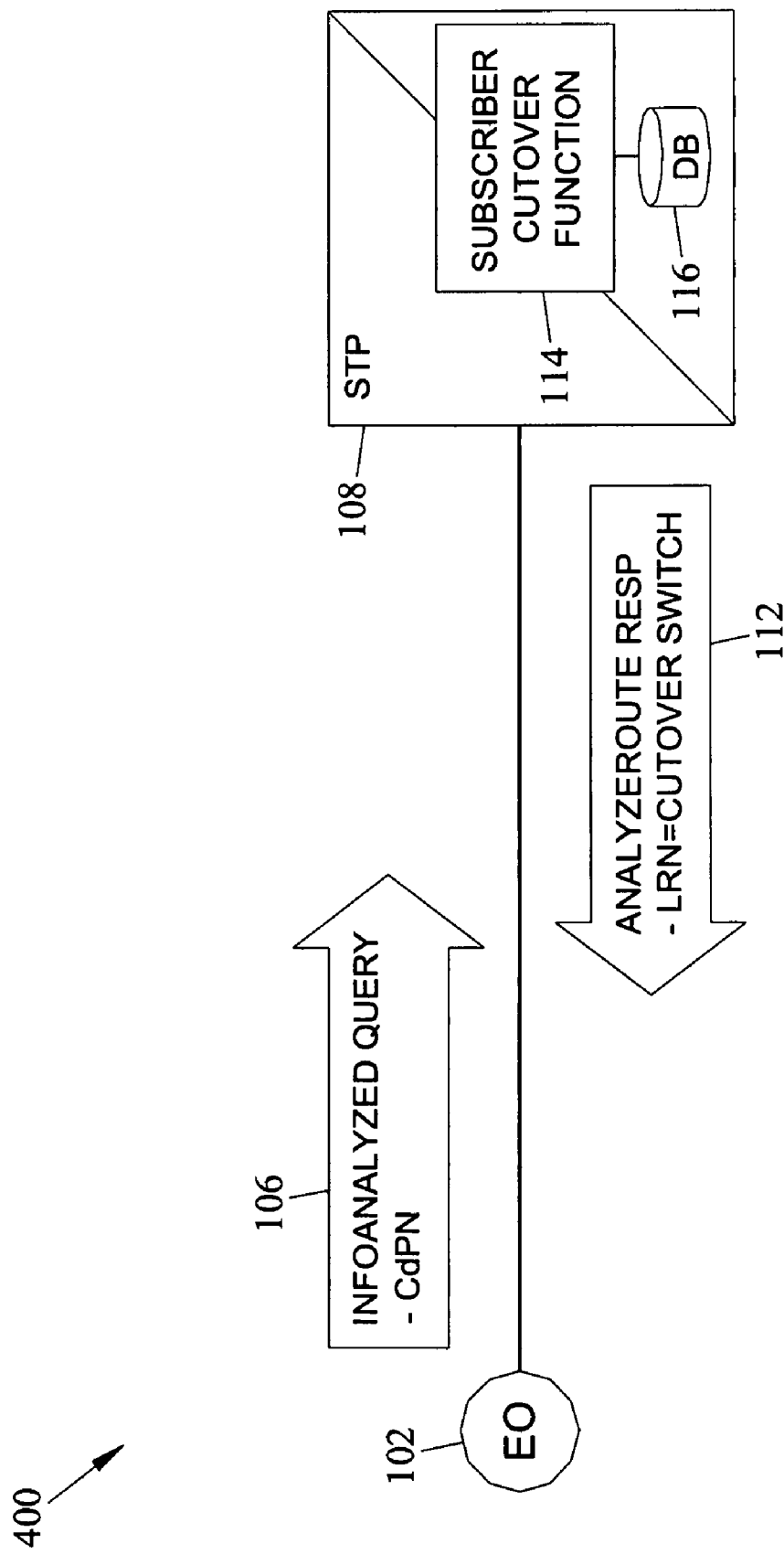
FIG. 4 is a network diagram illustrating an exemplary system in which a routing node responds to LRN based queries using information contained in a subscriber cutover database according to an embodiment of the subject matter described herein.

In the examples described above, a cutover lookup is triggered based on a number portability response message received or intercepted from a number portability database. In an alternate example, the access to number portability database 110 may be eliminated, and routing node 108 may receive or intercept and respond to number portability queries using information contained in subscriber cutover database 116. FIG. 4 illustrates such an embodiment. Although FIG. 4 describes the use of number portability messages, those skilled in the art realize that any LRN based query or response messages to effect subscriber cutover may be used. In response to a call attempt, end office 102 may send LNP InfoAnalyzed query 106, that includes a called party number or like communications service subscriber identifier, to routing node 108.

Subscriber cutover function 108 of routing node 108 may receive or intercept query 106 and extract the called party number from query 106. Based on the called party number in query 106, subscriber cutover function 114 may determine a cutover switch LRN associated with the called party number. For example, subscriber cutover function 114 may search subscriber cutover function database 116 for a cutover switch LRN associated with the called party number. If a cutover switch LRN associated with the called party number is found, function 114 may generate an AnalyzeRoute response message 112 including the cutover switch LRN. Message 112 may be routed to end office 102. As a result, function 114 may operate on behalf of an LNP system. If a cutover switch LRN associated with the called party number is not found in database 116, routing node 108 may route query 106 to an LNP system for LNP processing. When operated in this manner, STP 108 and associated subscriber cutover function 114 serve to shield an LNP system, such as LNP SCP 110, from unnecessary query traffic.

Figure 5:
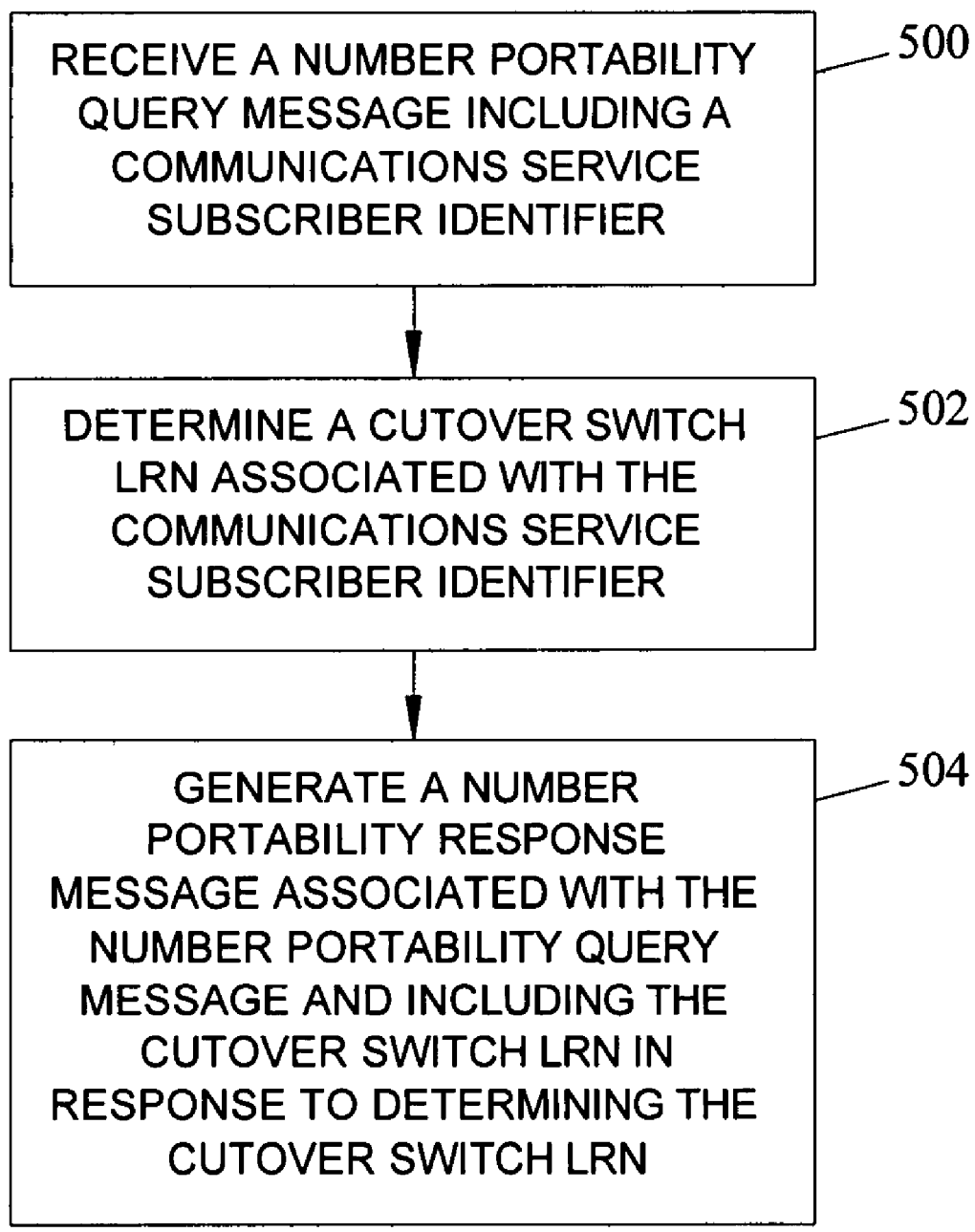
FIG. 5 is a flow chart of an exemplary process in which a routing node responds to LRN based queries using information contained in a subscriber cutover database in the communications network shown in FIG. 4 according to an embodiment of the subject matter described herein.

FIG. 5 illustrates a flow chart of an exemplary process in which a routing node responds to LRN based queries using information contained in subscriber cutover database 114 in communications network 400 shown in FIG. 4 according to an embodiment of the subject matter described herein. Although FIG. 5 describes the use of number portability messages, those skilled in the art realize that any LRN based query or response messages to effect subscriber cutover may be used. Referring to FIG. 5, in block 500, subscriber cutover function 114 may receive a number portability query message including a communications service identifier. For example, subscriber cutover function 114 may receive InfoAnalyzed query message 106 including a called party number.

In block 502, subscriber cutover function 114 may determine a cutover switch LRN associated with the communication service provider identifier. For example, subscriber cutover function 114 may use the called party number in InfoAnalyzed query message 106 to perform a lookup in database 116 for a cutover switch LRN associated with the called party number.

In block 504, in response to determining the cutover switch LRN, subscriber cutover function 114 may generate a number portability response message associated with the number portability query message and including the cutover switch LRN. For example, function 114 may generate response message 112 in response to receiving query 106. Message 112 may include the cutover switch LRN associated with the called party number in query 106. Further, function 114 may route message 112 to end office 102. If a cutover switch LRN associated with the called party number is not found in database 116, routing node 108 may route query 106 to an LNP system for LNP processing.

Any suitable routing node or call processing node (e.g., media gateway controller, softswitch) may include a subscriber cutover function in accordance with the subject matter described herein. For example, a subscriber cutover function may be included in an SS7/IP-capable STP routing node or a signaling gateway (SG) routing node. In one example, a suitable system for routing a call to a subscriber that has been cutover from a donor switch to a recipient switch in communications network according to the subject matter described herein may include an EAGLE STP® or an IP[7] SECURE GATEWAY® (both commercially available from Tekelec of Morrisville, N.C.).

Figure 6:
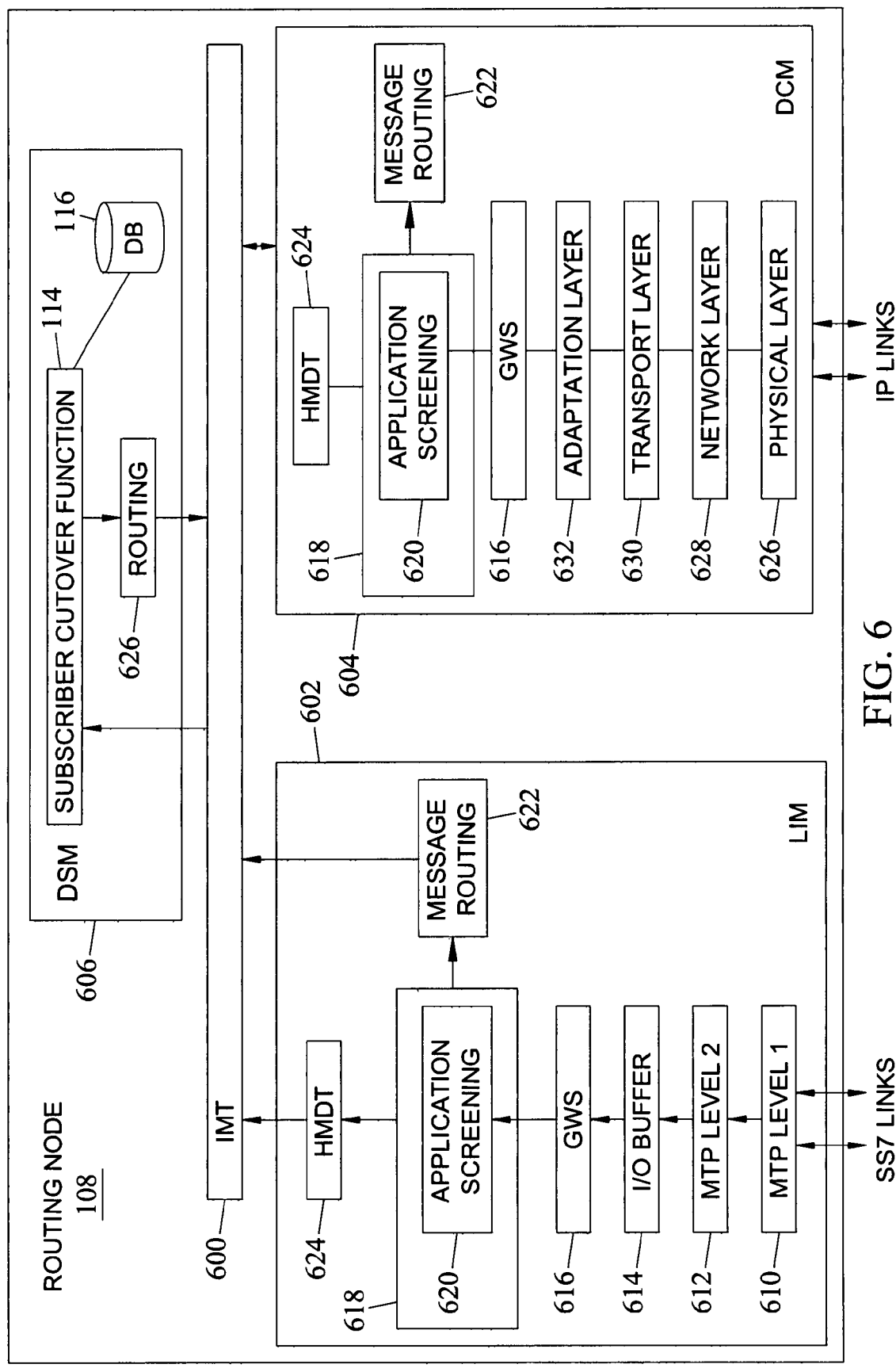
FIG. 6 is a block diagram illustrating an exemplary signal transfer point (STP) routing node including an LRN based subscriber cutover function according to an embodiment of the subject matter described herein.

FIG. 6 is a block diagram illustrating an exemplary network routing node 108 (e.g., an STP routing node with SS7/IP gateway functionality) including an LRN based subscriber cutover function according to an embodiment of the subject matter described herein. Referring to FIG. 6, routing node 108 includes an interprocessor message transport (IMT) bus 600 that is the main communication bus among internal subsystems within routing node 108. In one embodiment, this high-speed communications system includes two counter-rotating serial rings. A number of processing modules or cards may be coupled to IMT bus 600. In FIG. 6, IMT bus 600 may be coupled to a link interface module (LIM) 602, a data communications module (DCM) 604, and a database service module (DSM) 606, which includes a subscriber cutover function 608. These modules are physically connected to IMT bus 600 such that signaling and other types of messages may be routed internally between active cards or modules. For simplicity of illustration, only a single LIM, a single DCM, and a single DSM cards are included in FIG. 6. However, routing node 108 may include multiple other LIMs, DCMs, and DSMs, and other cards, all of which may be simultaneously connected to and communicating via IMT bus 600.

Each module 602, 604, and 606 may include an application processor and a communication processor. The communication processor may control communication with other modules via IMT bus 600. The application processor on each module may execute the applications or functions that reside on each module. For example, the application processor on DSM 606 may execute software that implements subscriber cutover function 114. Similarly, the application processor on LIM 602 may execute software that implements a screening function for determining whether messages should be forwarded to DSM 606 for application to a subscriber cutover function.

LIM 602 may include an SS7 MTP level 1 function 610, an SS7 MTP level 2 function 612, an I/O buffer 614, a gateway screening (GWS) function 616, an SS7 MTP level 3 message handling and discrimination (HMDC) function 618, including an application screening function 620, a message routing function 622, and a message handling and distribution (HMDT) function 624. MTP level 1 function 610 sends and receives digital data over a particular physical interface. MTP level 2 function 612 provides error detection, error correction, and sequenced delivery of SS7 message packets. I/O buffer 614 provides temporary buffering of incoming and outgoing signaling messages.

GWS function 616 examines received message packets and determines whether the message packets should be allowed in routing node 108 for processing and/or routing. HMDC function 618 performs discrimination operations, which may include determining whether the received message packet requires processing by an internal processing subsystem or is simply to be through switched (i.e., routed on to another node in the network). Messages that are permitted to enter routing node 108 may be routed to other communications modules in the system or distributed to an application engine or processing module via IMT bus 600. Routing function 622 may route received messages that identified by function 618 as requiring routing to the appropriate LIM or DCM associated with the message destination. Exemplary routing criteria that may be used by routing function 622 to route messages include destination point code (DPC), origination point code (OPC), circuit identifier code (CIC), service indicator (SI), inbound linkset, or any combination thereof. HMDT function 624 distributes messages identified by discrimination function 618 as requiring further processing to the appropriate processing module within routing node 108 for providing the processing.

Application screening function 620 may examine received message packets and determine whether the message packets should be forwarded to DSM 606 for application to subscriber cutover function 114. For example, application screening function 620 may determine whether a received message packet is a number portability response message including a called party number. In particular, for example, application screening function 620 may determine whether a received message packet is an AnalyzeRoute response message such as response message 112. In another example, application screening function 620 may determine whether a received message packet is a number portability query message including a called party number. In particular, for example, application screening function 620 may determine whether a received message packet is an InfoAnalyzed query such as query 106. If it is determined that the received message should be forwarded to DSM 606, the message is forwarded to DSM 606 for application to subscriber cutover function 114. If it is determined that the received message should not be forwarded to DSM 606, the message will be routed by routing node 108 without application to a subscriber cutover function.

DCM 604 includes functionality for sending and receiving SS7 messages over IP signaling links. In the illustrated example, DCM 504 includes a physical layer function 625, a network layer function 628, a transport layer function 630, an adaptation layer function 632, and functions 616, 618, 620, 622, and 624 described above with regard to LIM 602. Physical layer function 625 performs open systems interconnect (OSI) physical layer operations, such as transmitting messages over an underlying electrical or optical interface. In one example, physical layer function 625 may be implemented using Ethernet. Network layer function 628 performs operations, such as routing messages to other network nodes. In one implementation, network layer function 628 may implement Internet protocol. The transport layer function 630 implements OSI transport layer operations, such as providing connection oriented transport between network nodes, providing connectionless transport between network nodes, or providing stream oriented transport between network nodes. Transport layer function 630 may be implemented using any suitable transport layer protocol, such as stream control transmission protocol (SCTP), transmission control protocol (TCP), or user datagram protocol (UDP). Adaptation layer function 632 performs operations for sending and receiving SS7 messages over IP transport. Adaptation layer function 632 may be implemented using any suitable IETF or other adaptation layer protocol. Examples of suitable protocols include MTP level 2 peer-to-peer user adaptation layer (M2PA), MTP level 3 user adaptation layer (M3UA), and/or signaling connection control part (SCCP) user adaptation layer (SUA). Functions 618, 620, 622, and 624 perform the same operations as the corresponding components described above with regard to LIM 602.

DSM 606 receives messages identified for application to subscriber cutover function 114. In one embodiment, function 114 determines a cutover switch LRN associated with the called party number in a received AnalyzedRoute response message. In particular, function 114 may use the called party number in the received message to perform a lookup in database 116 for a cutover switch LRN associated with the called party number. The cutover switch LRN associated with the communications service subscriber identifier is inserted into the received message. After insertion of the cutover switch LRN, the message can be forwarded to a routing function 626 for routing to DCM 604 via IMT bus 600. If no cutover switch LRN is found that is associated with the called party number, then no LRN in inserted in the received message. LIM 604 may then forward the message to an appropriate end office.

Table 1 below shows exemplary entries in a database for associating a called party number with a cutover switch LRN.

TABLE 1

Exemplary Entries for Associating a Called Party Number
with a Cutover Switch LRN

| Called Party Number | Cutover Switch LRN |
|---|---|
| 9194605500 | 9195550000 |
| 9194691010 | 9195550001 |

The entries shown in Table 1 may be stored, for example, in database 116. Subscriber cutover function 114 may use a called party number in a received number portability message to perform a lookup in the table for determining whether a cutover switch LRN is associated with the called party number. If an entry including a cutover switch LRN is found for the called party number, it may be determined that the called party number is associated with the cutover switch LRN. In one example, if the called party number 9194605500 is contained in an AnalyzeRoute response message, subscriber cutover function 114 may insert the cutover switch LRN 9195550000 into the message and routing function 626 may forward the message to outbound LIM 604 for forwarding to an appropriate end office. In another example, if the called party number 9194691010 is contained in an AnalyzeRoute response message, subscriber cutover function 114 may insert the cutover switch LRN 9195550001 into the message and routing function 626 may forward the message to outbound LIM 604 for forwarding to an appropriate end office. An LRN as described herein may include any identifier that is used to identify a switching point in circuit or packet switched communication network. An LRN identifiers may include, but are not limited to, an E.164 formatted network entity address identifier, an SS7 point code address, an Internet protocol (IP) address, or a uniform resource identifier (URI).

In one implementation, database 116 may include a range-based data structure and an exception-based datastructure. Tables 2 and 3 shown below illustrate examples of a range-based data structure and an exception-based data structure that may be used to implement database 116 according to an embodiment of the subject matter described herein.

TABLE 2

Exemplary Entries for Associating Called Party Number Ranges
with a Cutover Switch LRN

| Called Party Number Begin Range | Called Party Number End Range | Cutover Switch LRN |
|---|---|---|
| 9194605000 | 9194605999 | 9195550010 |
| 9194691000 | 9194691999 | 9195550011 |

TABLE 3

Exemplary Exception Entries for Associating a Called
Party Number with a Cutover Switch LRN

| Called Party Number | Cutover Switch LRN |
|---|---|
| 9194605500 | 9195550000 |
| 9194691010 | 9195550001 |

The entries shown in Tables 2 and 3 may be stored, for example, in database 116. Subscriber cutover function 114 may use a called party number in a received number portability message to first perform a lookup in Table 3 (the exception-based data structure) for determining whether a cutover switch LRN is associated with the called party number. If the lookup in the exception-based data structure fails to locate a matching entry, a lookup may then be performed in Table 2 (range-based data structure). If an entry for the called party number including the cutover switch LRN is found in either lookup, it may be determined that the called party number is associated with the cutover switch LRN. In one example, if the called party number 9194605123 is contained in an AnalyzeRoute response message, exceptions-based lookup will not result in a match, and subscriber cutover function 114 will insert the cutover switch LRN 9195550010 into the message. Routing function 626 will then forward the message to LIM 602 or DCM 604 for forwarding to an appropriate end office. In another example, if the called party number is 9194691123 is contained in an AnalyzeRoute response message, the exceptions-based lookup will not result in a match, the range-based lookup will result in a match, and subscriber cutover function 114 will insert the cutover switch LRN 9195550011 into the message. Routing function 626 will then forward the message to LIM 602 or DCM 604 for forwarding to an appropriate end office.

As described above, Table 3 includes exceptions to the ranges of numbers provided in the entries of Table 2. In one example, an exception may be a number that is within the range but that has a different LRN or routing rule. For example, the first entry in Table 3 corresponds to called party number 9194605500. This number is within the range of 9194605000-9194605999 that corresponds to the first entry in Table 2. However, the entries have different LRNs. Thus, an exception based table, such as that illustrated in Table 3 may be used to flexibly allocate different routing instructions for numbers that are assigned to the associated subscribers. If a received called party number matches the called party number in an entry of Table 3, the cutover switch LRN in the entry of Table 3 is used for insertion into the received message. For example, if the received called party number is 9194605500, the exception-based lookup results in a match, the range-based lookup is bypassed, and the cutover switch LRN 9195550000 is used for insertion into the received message. In another example, if the received called party number is 9194691010 the exception-based lookup results in a match, the range-based lookup is bypassed, and 3, the cutover switch LRN 9195550001 is used for insertion into the received message.

As described above with regard to FIG. 3, subscriber cutover function 114 may receive an AnalyzeRoute response message including an LRN and a called party number. Function 114 may determine whether the received LRN is associated with an in-network node. For example, function 114 may use the received LRN to search perform a lookup in database 116 for an indication that the received LRN is associated with an in-network node. In response to determining that the received LRN is associated with an in-network node, function 114 may determine a cutover switch LRN associated with the called party number. For example, subscriber cutover function 114 may use the received called party number to perform a lookup in database 116 for a cutover switch LRN associated with the received called party number. Further, in response to determining that the received LRN is associated with an in-network node, function 114 inserts the cutover switch LRN associated with the called party number into the received message. After insertion of the cutover switch LRN, the message can be forwarded to a routing function 626 for routing to outbound LIM 604 via IMT bus 600. LIM 604 forwards the message to an appropriate end office. If the received LRN is not associated with an in-network node or no cutover switch LRN is found that is associated with the called party number, then no LRN in inserted in the received message and the message is forwarded for routing to outbound LIM 604 for forwarding to an appropriate end office.

Table 4 below shows exemplary entries in a database for indicating whether a received LRN is associated with an in-network node.

TABLE 4

Exemplary Entries for Indicating Whether a Received LRN is Associated with an In-Network Node

| LRN | In-Network |
|---|---|
| 9195550000 | Yes |
| 2125550000 | No |

The entries shown in Table 4 may be stored, for example, in database 116. Subscriber cutover function 114 may use an LRN in a received number portability message to perform a lookup in the table for determining whether the LRN is associated with an in-network node. The entry containing the LRN may indicate whether the LRN is associated with an in-network node. In one example, if the LRN is 9195550000, a lookup in the table indicates that the LRN is associated with an in-network node. In another example, if the LRN is 2125550000, a lookup in the table indicates that the LRN is not associated with an in-network node.

The above examples correspond to advanced intelligent network (AIN) implementations of the subject matter described herein. It is noted that, in AIN, an InfoAnalyzed query—AnalyzeRoute response pair may be used to request and receive an LRN from an SCP. The corresponding query—response pair in an intelligent network (IN) implementation is an InstructionStart query and ControlConnect response, respectively. Therefore, the subject matter described herein may be applied with respect to InstructionStart queries and ControlConnect responses of an IN implementation in a manner similar to the above AIN examples for InfoAnalyzed queries and AnalyzeRoute responses, respectively.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for using a location routing number (LRN) based query and response mechanism to effect subscriber cutover, the method comprising:
at a first network node separate from a second network node that originates an LRN based response message and a third network node comprising a destination for the LRN based response message:
(a) receiving the LRN based response message including a communications service subscriber identifier;
(b) determining a cutover switch LRN associated with the communications service subscriber identifier; and
(c) inserting the cutover switch LRN associated with the communications service subscriber identifier into the LRN based response message and routing the response message to the third network node.

2. The method of claim 1 wherein the LRN based response message comprises a number portability response message.

3. The method of claim 2 wherein receiving the number portability response message includes intercepting the number portability response message, wherein the first network node comprises a routing node located, wherein the third network node comprises a switching office and wherein the second network node comprises a number portability database.

4. The method of claim 1 wherein determining a cutover switch LRN associated with the communications service subscriber identifier includes searching a database for an entry including the communications service subscriber identifier, wherein the entry includes the cutover switch LRN.

5. The method of claim 1 wherein determining a cutover switch LRN associated with the communications service subscriber identifier includes:
(a) determining whether an entry including the communications service subscriber identifier is located in a first database comprising entries including a plurality of communications service subscriber identifiers and a plurality of associated cutover switch LRNs, wherein the first database includes communications service subscriber identifier exceptions to ranges of communications service subscriber identifiers in a second database; and
(b) in response to determining that an entry including the communications service subscriber identifier is not located in the first database, searching the second database for an entry including a range of communications service subscriber identifiers with the communications service subscriber identifier, wherein entry including the range of communications service subscriber identifiers with the communications service subscriber identifier includes the cutover switch LRN.

6. The method of claim 2 wherein inserting the cutover switch LRN includes replacing an LRN in the number portability response message with the cutover switch LRN.

7. The method of claim 2 wherein the first network node comprises a routing node, wherein the third network node comprises a switching office and wherein the second network node comprises a number portability database.

8. The method of claim 2 wherein routing the message includes routing the message to an originator of a number portability query message associated with the number portability response message.

9. The method of claim 2 comprising determining whether an LRN in the number portability response message is associated with an in-network node, and wherein determining a cutover switch LRN includes determining the cutover switch LRN in response to determining that the LRN in the number portability response message is associated with an in-network node.

10. A method for using a location routing number (LRN) based query and response mechanism to effect subscriber cutover, the method comprising:
at a first network node separate from a second network node comprising an originator of an LRN based query message:
(a) receiving the LRN based query message including a communications service subscriber identifier;
(b) determining a cutover switch LRN associated with the communications service subscriber identifier, wherein the cutover switch LRN comprises an LRN associated with a third network node placed into service to increase end office processing capacity in the same service provider's network to which the service subscriber identifier is currently assigned; and
(c) in response to determining the cutover switch LRN, generating an LRN based response message associated with the LRN based query message and including the cutover switch LRN.

11. The method of claim 10, wherein the LRN based response message comprises a number portability response message and the LRN based query message comprises a number portability query message.

12. The method of claim 11 wherein the first network node comprises a routing node, wherein the second network node comprises a switching office and wherein the query message is addressed to a number portability database and is intercepted by the first network node.

13. The method of claim 10 wherein determining a cutover switch LRN associated with the communications service subscriber identifier includes searching a database for an entry including the communications service subscriber identifier, wherein the entry includes the cutover switch LRN.

14. The method of claim 10 wherein determining a cutover switch LRN associated with the communications service subscriber identifier includes:
(a) determining whether an entry including the communications service subscriber identifier is located in a first database comprising entries including a plurality of communications service subscriber identifiers and a plurality of associated cutover switch LRNs, wherein the first database includes communications service subscriber identifier exceptions to ranges of communications service subscriber identifiers in a second database; and
(b) in response to determining that an entry including the communications service subscriber identifier is not located in the first database, searching the second database for an entry including a range of communications service subscriber identifiers with the communications service subscriber identifier, wherein entry including the range of communications service subscriber identifiers with the communications service subscriber identifier includes the cutover switch LRN.

15. The method of claim 10 wherein the first network node comprises a routing node.

16. The method of claim 11 comprising routing the generated number portability response message.

17. The method of claim 16 wherein routing the generated number portability response message includes routing the number portability response message to the originator of the number portability query message.

18. The method of claim 11 comprising:
(a) failing to determine a cutover switch LRN associated with the communications service subscriber identifier; and
(b) in response to failing to determine a cutover switch LRN, forwarding the number portability query message to a number portability translation system.

19. A method for using a location routing number (LRN) based query and response mechanism to effect subscriber cutover, the method comprising:
at a first network node that is separate from a second network node comprising an originator of an LRN based response message and a third network node comprising a destination for the LRN based response message:
(a) receiving an LRN based query message including transaction identification information and a communications service subscriber identifier;
(b) associating an LRN based response message with the LRN based query message based on the transaction identification information;
(c) determining a cutover switch LRN associated with the communications service subscriber identifier; and
(d) inserting the cutover switch LRN associated with the communications service subscriber identifier into the LRN based response message and routing the message to the third network node.

20. The method of claim 19, wherein the LRN based response message comprises a number portability response message and the LRN based query message comprises a number portability query message.

21. The method of claim 20 wherein receiving the number portability response message includes intercepting the number portability response message at the first network node, wherein the first network node comprises a routing node, wherein the third network node comprises a switching office and wherein the second network node comprises a number portability database.

22. The method of claim 20 wherein associating the number portability response message with the number portability query message includes comparing the transaction identification information of the number portability query message transaction identification information of the number portability response message.

23. The method of claim 19 wherein determining a cutover switch LRN associated with the communications service subscriber identifier includes searching a database for an entry including the communications service subscriber identifier, wherein the entry includes the cutover switch LRN.

24. The method of claim 19 wherein determining a cutover switch LRN associated with the communications service subscriber identifier includes:
 (a) determining whether an entry including the communications service subscriber identifier is located in a first database comprising entries including a plurality of communications service subscriber identifiers and a plurality of associated cutover switch LRNs, wherein the first database includes communications service subscriber identifier exceptions to ranges of communications service subscriber identifiers in a second database; and
 (b) in response to determining that an entry including the communications service subscriber identifier is not located in the first database, searching the second database for an entry including a range of communications service subscriber identifiers with the communications service subscriber identifier, wherein entry including the range of communications service subscriber identifiers with the communications service subscriber identifier includes the cutover switch LRN.

25. The method of claim 20 wherein inserting the cutover switch LRN includes replacing an LRN in the number portability response message with the cutover switch LRN.

26. The method of claim 20 wherein the first network node comprises a routing node, wherein the third network node comprises a switching office and wherein the second network node comprises a number portability database.

27. The method of claim 20 wherein routing the message includes routing the message to the originator of the number portability query message associated with the number portability response message.

28. The method of claim 19 comprising temporarily storing the transaction identification information and the communications service subscriber identifier.

29. A system for using a location routing number (LRN) based query and response mechanism to effect subscriber cutover, the system comprising:
 a first network node that is separate from a second network node that originates an LRN based response message and a third network node comprising destination for the LRN based response message, the first network node including:
 (a) a communications module located within the first network node and configured to receive the LRN based response message including a communications service subscriber identifier; and
 (b) a subscriber cutover function located within the first network node and configured to determine a cutover switch LRN associated with the communications service subscriber identifier, configured to insert the cutover switch LRN associated with the communications service subscriber identifier into the LRN based response message, and configured to route the LRN based response message to the third network node.

30. The system of claim 29, wherein the LRN based response message comprises a number portability response message.

31. The system of claim 30 wherein the communications module is adapted to intercept the number portability response message, wherein the first network node comprises a routing node, wherein the third network node comprises a switching office and wherein the second network node comprises a number portability database.

32. The system of claim 29 wherein the subscriber cutover function is configured to search a database for an entry including the communications service subscriber identifier, wherein the entry includes the cutover switch LRN.

33. The system of claim 29 wherein the subscriber cutover function is configured to:
 (a) determine whether an entry including the communications service subscriber identifier is located in a first database comprising entries including a plurality of communications service subscriber identifiers and a plurality of associated cutover switch LRNs, wherein the first database includes communications service subscriber identifier exceptions to ranges of communications service subscriber identifiers in a second database; and
 (b) search the second database, in response to determining that an entry including the communications service subscriber identifier is not located in the first database, for an entry including a range of communications service subscriber identifiers with the communications service subscriber identifier, wherein entry including the range of communications service subscriber identifiers with the communications service subscriber identifier includes the cutover switch LRN.

34. The system of claim 30 wherein the subscriber cutover function is configured to replace an LRN in the number portability response message with the cutover switch LRN.

35. The system of claim 30 wherein the third network node comprises an originator of a number portability query message associated with the number portability response message.

36. The method of claim 30 wherein the subscriber cutover function is configured to determine whether an LRN in the number portability response message is associated with an in-network node, and wherein the subscriber cutover function is configured to determine the cutover switch LRN in response to determining that the LRN in the number portability response message is associated with an in-network node.

37. A system for using a location routing number (LRN) based query and response mechanism to effect subscriber cutover, the system comprising:
 a first network node separate from a second network node that originates an LRN based query message, the first network node including:
 (a) a communications module located within the first network node and configured to receive the LRN based query message including a communications service subscriber identifier; and
 (b) a subscriber cutover function located within the first network node and configured to:
  (i) determine a cutover switch LRN associated with the communications service subscriber identifier, wherein the cutover switch LRN comprises an LRN associated with a third network node placed into service to increase end office processing capacity in the same service provider's network to which the service subscriber identifier is currently assigned; and
  (ii) generate an LRN based response message associated with the LRN based query message and including the cutover switch LRN in response to determining the cutover switch LRN.

38. The system of claim 37, wherein the LRN based response message comprises a number portability response message and the LRN based query message comprises a number portability query message.

39. The system of claim 38 wherein the communications module is adapted to intercept the number portability response message addressed to a number portability database, wherein the first network node comprises a routing node, wherein the second network node comprises a switching office.

40. The system of claim 37 wherein the subscriber cutover function is configured to search a database for an entry including the communications service subscriber identifier, wherein the entry includes the cutover switch LRN.

41. The system of claim 37 wherein the subscriber cutover function is configured to:
    (a) determine whether an entry including the communications service subscriber identifier is located in a first database comprising entries including a plurality of communications service subscriber identifiers and a plurality of associated cutover switch LRNs, wherein the first database includes communications service subscriber identifier exceptions to ranges of communications service subscriber identifiers in a second database; and
    (b) in response to determining that an entry including the communications service subscriber identifier is not located in the first database, search the second database for an entry including a range of communications service subscriber identifiers with the communications service subscriber identifier, wherein entry including the range of communications service subscriber identifiers with the communications service subscriber identifier includes the cutover switch LRN.

42. The system of claim 38 wherein the subscriber cutover function is configured to route the generated number portability response message.

43. The system of claim 38 wherein the subscriber cutover function is configured to route the number portability response message to the second network node.

44. The system of claim 38 wherein the subscriber cutover function is configured to:
    (a) fail to determine a cutover switch LRN associated with the communications service subscriber identifier; and
    (b) in response to failing to determine a cutover switch LRN, forward an LRN based query message to a number portability translation system.

45. A system for a location routing number (LRN) based query and response mechanism to effect subscriber cutover, the system comprising:
    a first network node that is separate from a second network node comprising an originator of an LRN based response message and a third network node comprising a destination for the LRN based response message, the first network node including:
    (a) a communications module located within the first network node and configured to receive an LRN based query message including transaction identification information and a communications service subscriber identifier; and
    (b) a subscriber cutover function located within the first network node and configured to:
        (i) associate the LRN based response message with the LRN based query message based on the transaction identification information;
        (ii) determine a cutover switch LRN associated with the communications service subscriber identifier; and
        (ii) insert the cutover switch LRN associated with the communications service subscriber identifier into the LRN based response message and route the LRN based response message to the third network node.

46. The system of claim 45, wherein the LRN based response message comprises a number portability response message and the LRN based query message comprises a number portability query message.

47. The system of claim 46 wherein the communications module is configured to intercept the number portability response message, wherein the first network node comprises a routing node, wherein the third network node comprises a switching office and wherein the second network node comprises a number portability database.

48. The system of claim 46 wherein the subscriber cutover function is configured to compare the transaction identification information of the number portability query message transaction identification information of the number portability response message.

49. The system of claim 45 wherein the subscriber cutover function is configured to search a database for an entry including the communications service subscriber identifier, wherein the entry includes the cutover switch LRN.

50. The system of claim 45 wherein the subscriber cutover function is configured to:
    (a) determine whether an entry including the communications service subscriber identifier is located in a first database comprising entries including a plurality of communications service subscriber identifiers and a plurality of associated cutover switch LRNs, wherein the first database includes communications service subscriber identifier exceptions to ranges of communications service subscriber identifiers in a second database; and
    (b) in response to determining that an entry including the communications service subscriber identifier is not located in the first database, search the second database for an entry including a range of communications service subscriber identifiers with the communications service subscriber identifier, wherein entry including the range of communications service subscriber identifiers with the communications service subscriber identifier includes the cutover switch LRN.

51. The system of claim 46 wherein the subscriber cutover function is configured to replace an LRN in the number portability response message with the cutover switch LRN.

52. The system of claim 46 wherein the wherein the third network node comprises an originator of the number portability query message associated with the number portability response message.

53. The system of claim 45 wherein the subscriber cutover function is configured to temporarily store the transaction identification information and the communications service subscriber identifier.

54. A computer program product comprising computer executable instructions embodied in a non-transitory computer readable medium for performing steps comprising:
    at a first network node that is separate from a second network node that originates an LRN based response message and a third network node comprising a destination for the LRN based response message:
    (a) receiving the location routing number (LRN) based response message including a communications service subscriber identifier;
    (b) determining a cutover switch LRN associated with the communications service subscriber identifier; and
    (c) inserting the cutover switch LRN associated with the communications service subscriber identifier into the LRN based response message and routing the LRN based response message to the third network node.

55. The computer program product of claim 54, wherein the LRN based response message comprises a number portability response message.

56. A computer program product comprising computer executable instructions embodied in a non-transitory computer readable medium for performing steps comprising:

at a first network node separate from a second node that originates an LRN based query message:

(a) receiving the location routing number (LRN) based query message including a communications service subscriber identifier;

(b) determining a cutover switch LRN associated with the communications service subscriber identifier, wherein the cutover switch LRN comprises an LRN associated with a third network node placed into service to increase end office processing capacity in the same service provider's network to which the service subscriber identifier is currently assigned; and (c) in response to determining the cutover switch LRN, generating a LRN based response message associated with the LRN based query message and including the cutover switch LRN.

57. The computer program product of claim 56, wherein the LRN based response message comprises a number portability response message and the LRN based query message comprises a number portability query message.

58. A computer program product comprising computer executable instructions embodied in a non-transitory computer readable medium for performing steps comprising:

at a first network node that is separate from a second network node comprising an originator of an LRN based response message and a third network node comprising a destination for the LRN based response message:

(a) receiving a location routing number (LRN) based query message including transaction identification information and a communications service subscriber identifier;

(b) associating the LRN based response message with the LRN based query message based on the transaction identification information;

(c) determining a cutover switch LRN associated with the communications service subscriber identifier; and (d) inserting the cutover switch LRN associated with the communications service subscriber identifier into the LRN based response message and routing the message to the third network node.

59. The computer program product of claim 58, wherein the LRN based response message comprises a number portability response message and the LRN based query message comprises a number portability query message.

\* \* \* \* \*